May 18, 1954     R. J. LISON ET AL     2,678,462
POWER SWEEPER PROVIDED WITH DUST PREVENTING MEANS
Filed May 21, 1949     3 Sheets-Sheet 1

INVENTORS.
ROBERT J. LISON
JOHN L. NEWPORT
BY
ATTORNEY

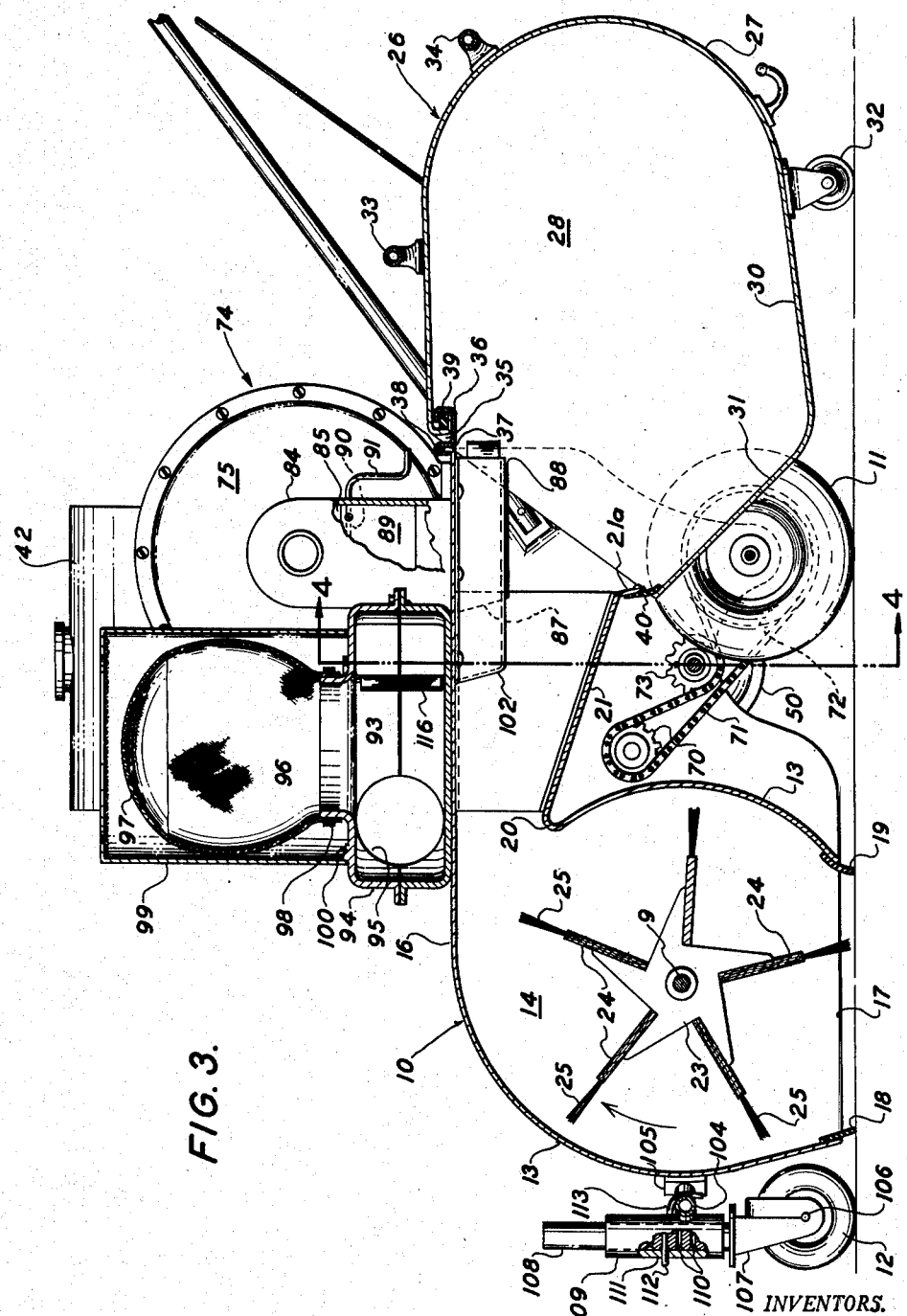

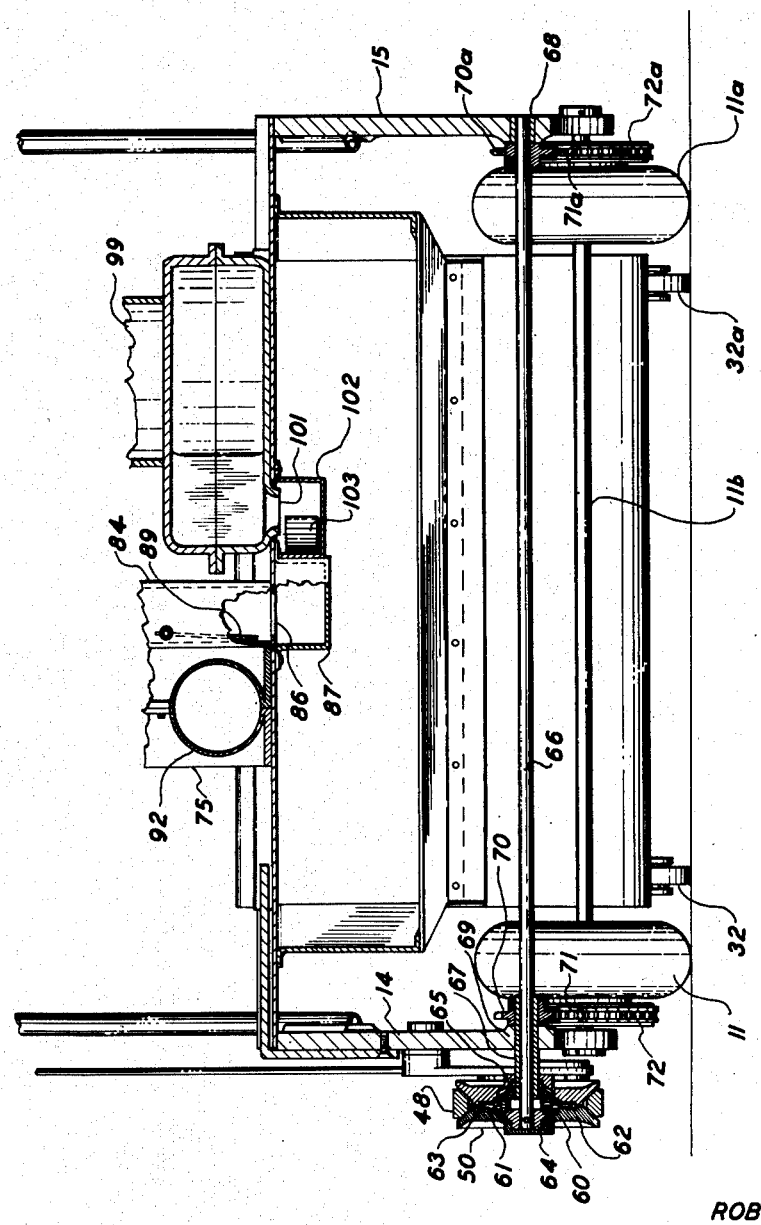

UNITED STATES PATENT OFFICE 2,678,462

POWER SWEEPER PROVIDED WITH DUST PREVENTING MEANS

Robert J. Lison, North Hollywood, and John L. Newport, Pasadena, Calif., assignors to Wilshire Power Sweeper Company, Glendale, Calif., a corporation of California Application May 21, 1949, Serial No. 94,569

5 Claims. (Cl. 15—349)

This invention relates to sweepers and has for its object to provide an efficient and effective power-operated sweeper.

A related object is to provide an effective sweeping of both heavy and light substances, including dust, while avoiding the undesired discharged of dust into the air from the sweeper.

The invention is carried out by provision of a sweeper and fan arrangement for picking up debris, dirt and dust and carrying it up through a housing or conduit, from which it is discharged into a collector attached to the discharge opening from the conduit. According to a feature, means is provided for reducing the pressure in the collector so that dust will not be blown out from it into the room or atmosphere. This means comprises a blower arranged to receive its air from within the collector, and to discharge it elsewhere, for example, through a porous bag or the like so that the dust or similar particles will be held in the bag. This sufficiently reduces the pressure within the collector so that the tendency will be for air to be drawn into the collector from any spaces between it and the main housing and not to be blown out through such spaces. Preferably this arrangement for drawing the air from the collector comprises a channel extending to the collector from the auxiliary blower.

A related feature is the provision of means for separating heavy particles or pieces of debris from lighter pieces, this means comprising a centrifuge construction situated in the path of the air blown from the collector so that particles too heavy to be carried up from the centrifuge will be whirled around the centrifuge. A suitable exit provided in the path of the whirling debris in the centrifuge allows the heavier particles to drop down back into the collector.

Other features reside in adjusting the force of the blower and also in facilitating the exit of pieces from the centrifuge.

According to a preferred arrangement, a power drive is applied to the wheels of the sweeper; and this may be done through a clutch arrangement so that the power can be turned on and off at will to move the sweeper forward. The same motor may be used to operate the main fan and brushes and the auxiliary blower.

It is highly preferable for the main drive wheels to be driven through a differential in order to facilitate the turning of the sweeper while it is moving, and this is preferably done by a form of floating differential.

The foregoing and other features of our invention will be better understood from the following detailed description and the accompanying drawings of which:

Fig. 3 is a cross-section view taken at line 3—3 of Fig. 2; and

Fig. 4 is a cross-section taken at line 4—4 of Fig. 3.

Figure 1:
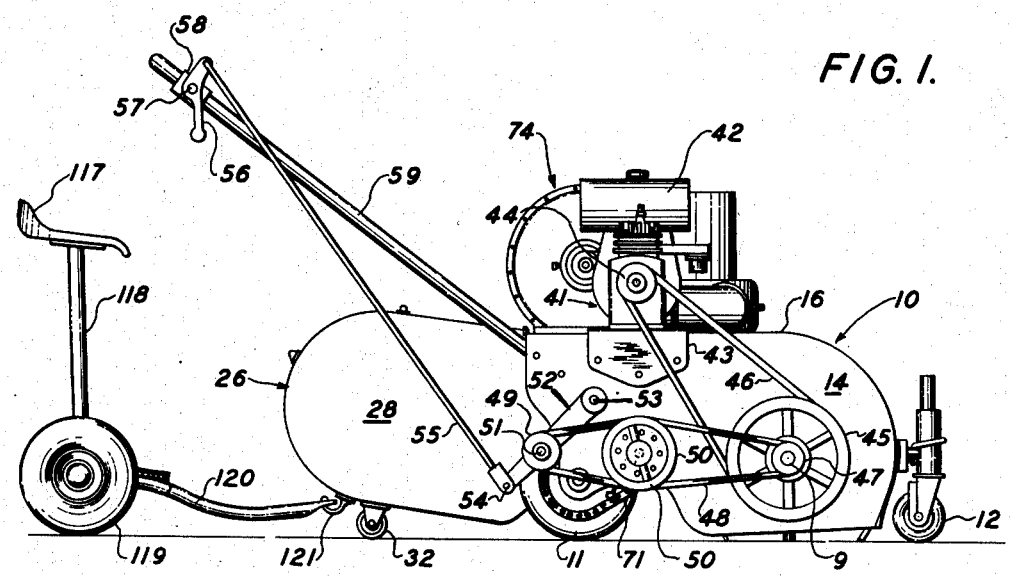
Fig. 1 is a side elevation view of a power sweeper in accordance with our invention.

Referring to the drawings, the sweeper comprises a housing 10 which will ordinarily be constructed of sheet metal, although it will be understood that other structural materials serving the same purpose might be used. The housing is adapted to be rolled along a floor or the ground on a pair of side wheels 11 and 11a, which take most of the weight. A smaller front wheel 12 located at the center is provided to take the weight at the front end. The housing comprises a cylindrical portion 13 located at the forward end of the machine, the ends of the cylinder being closed by the vertical side members 14 and 15, and being covered at the top by the horizontal top portion 16. At the bottom of the cylinder, there is provided a rectangular opening 17 adjacent the floor or ground extending across the machine; and for the purpose of closing the space between the lower portion of the cylinder and the floor there are provided rubber or rubber-like flaps 18 and 19 all around the opening, the flaps extending down approximately to the floor. The wall forming the rear part of the cylinder 13 is shaped at its upper part into a neck 20 so that the sheet metal or the like forming the wall is flared rearwardly with a downward slant forming the plane wall 21. Thus, the rear ends of the top wall 16 and the downwardly slanting wall 21 form the rear exit opening from the cylinder.

At approximately the longitudinal axis of the cylinder 13 there is located a shaft 9 extending horizontally across the cylinder from one side to the other; and to support the shaft there are provided bearing journal members 22 and 22a suitably fastened to the respective side walls 14 and 15. Within the cylinder there is fastened to the shaft a hub 23 extending substantially from one side wall to the other; and to this hub there are supported at regular angular distances apart, a plurality of radially extending brush supports 24, there being five such supports shown. These brush supports are preferably solid sheet-like members of a rectangular shape which extend substantially across the cylinder from one vertical side wall to the other. At the outer edges of these supports there are fastened respective brushes 25 which may be constructed in a well known form of bristles or the like closely spaced together. Preferably the construction of the brushes should be such that there is little or no space between the bristles, and also so that the bristles may yield as the end of the brushes scrape along the floor or ground.

For collecting the sweepings there is provided a collector 26 which comprises a sheet metal or other sheetlike material 27 shaped and curved to provide a substantially flat top, a generally curved or semi-circular back and a bottom which is shaped as shown. The vertical sides 28 and 29 may be of the same sheet material. Most of the bottom is composed of an almost horizontal region 30, the forward part of the bottom being bent upward to form a plane 31. To permit rolling, there are provided a pair of wheels 32 and 32a, mounted under the bottom as shown. To permit ready handling of the collector, there are provided a pair of handles 33 and 34 which may be in the form of bars or the like fastened horizontally across the top, as shown. To fasten the collector to the back of the sweeper housing, the forward edge of the top 27 is bent downward and rearward providing a hook edge 35 which engage a corresponding hook edge 36 suitably attached along the back edge of top 16 of the housing. The member 36 may conveniently be fastened to member 16 by bending the rear edge of the latter upwardly at 37 and forming an inverted U 38 along the forward edge of member 36, the sides of the inverted U being crimped against member 37. Preferably, a resilient strip 39 of rubber or the like is fastened within the hook 35 to act as a convenient resilient buffer where the receptacle hooks to the sweeper housing. To fit the receptacle to the sweeper, the operator can wheel the receptacle forward until the hook 35 passes over the hook-edge 36; then when the collector wheels back slightly, it will be hooked, and the lower edge 31 will rest against the downwardly depending lip 21a from the housing. To insure a good fit all around the perimeter where the collector meets the sweeper housing, there is preferably fitted a rubber strip 40 at the opening from the housing, as shown.

For operating the device there is provided a motor or engine 41, which may be an ordinary gasoline engine or the like, having a gasoline tank 42, and mounted on the housing top 16 by a suitable mounting plate or member 43. The power shaft of the engine has fastened to it a drive pulley 44 which drives a pulley wheel 45 fixed on shaft 9, by means of a drive belt 46, thereby turning the shaft 9 in the clockwise direction (with reference to Fig. 3). A smaller pulley wheel 47, also fixed on shaft 21 drives a belt 48 which is carried over an idler pulley 49 and over the pulley wheel 50 of a differential gear assembly. The idler pulley 49 is mounted on a pin or shaft 51 protruding from a lever 52 which is mounted on a pivot 53 attached to the side 14 of the sweeper housing. The lower or free end of the lever 52 has pivoted to it at 54 a rod 55 operable by a handle 56 which is pivoted at 57 on a fitting 58 fastened on the main handle 59 which extends upwardly and rearwardly from the two sides of the sweeper housing. Thus, pushing upwardly toward handle 59 (with reference to Fig. 1) on the handle 56 operates 52 to tighten the belt 48 on wheel 50 and thereby drive pulley wheel 50.

The pulley 50 is part of a floating differential gear assembly more fully described in our co-pending application Serial No. 94,568, filed concurrently herewith, and now abandoned. Briefly, it comprises a pair of oppositely disposed bevel gears 60 and 61 mounted on respective pins 62 and 63 which extend into corresponding bores within the pulley wheel 50 and along a diameter thereof, so that these bevel gears are free to idle with respect to each other and to the pulley wheel. The bevel gears 64 and 65 which face each other and mesh with both of the first two bevel gears 60 and 61, complete the bevel gear system of the differential. The bevel gear 64 is pinned to a shaft 66 which passes through a sleeve 67 and through a bearing or bushing 68 fixed through the side wall 15 of the housing. The sleeve 67, in turn, is pinned to the bevel gear 65 and is journaled within a suitable bearing 69 in the opposite side wall 14.

The two drive wheels 11 and 11a of the sweeper are driven through the differential by a chain and sprocket arrangement. These comprise sprocket wheels 70 and 70a at the opposite sides of the sweeper, the sprocket 70 being fastened to sleeve 67, and the sprocket 70a being fastened to shaft 66. Respective chains 71 and 71a couple these sprocket wheels with larger sprocket wheels 72 and 72a which are attached to the hubs of the respective side wheels 11 and 11a, which are freely rotatable relative to each other on shaft 11b.

The operation of the differential and drive arrangement is such that when the clutch handle 56 is operated to pull the belt 48 into driving relationship with pulley wheel 50, the power is transmitted through the differential to both the sleeve 67 and the shaft 66, to drive both of the drive wheels 11 and 11a equally and thereby propel the sweeper forwardly while the brush shaft is rotating. When the operator turns the sweeper either to the right or the left by pressure on the handle 59, the operation of the floating differential will be such as to keep the power on both drive wheels while the sweeper is being turned.

The construction of the brushes 25 and their radial vanes is to cause it to act as a fan blowing air from opening 17 up through the cylinder to the exit from the housing, in the direction of the arrow.

In order to prevent the dust which is swept up by the brush from being blown out between the junction of the catcher and the back of the sweeper housing, there is provided a suction dust collector arrangement to apply sufficient suction within the catcher to draw out the dust. This dust catching arrangement comprises a blower 74 mounted on the top of the sweeper housing and driven from the motor or engine 41. The blower may be of a suitable type such as a fan contained in a fan housing 75, the fan shaft 76 being driven by a pulley 77 mounted on the shaft and driven by a belt 78 from a drive pulley 79 mounted on a drive shaft 80 of the engine 41. To permit driving engagement and disengagement of the belt 78, there is provided an arm 81 carrying a freely rotatable pulley 82, the angular position of the arm 81 being adjustable on a hub of the housing 75 and fixable by a set screw 83 so as to adjust the position of pulley 82 against the belt.

The blower is provided with an enclosed inlet conduit 84 extending along one side of the blower and opening into the blower in a central position at 85. The lower end of conduit 84 passes to the top 16 of the sweeper housing and communicates with an opening 86 through the top 16. At the under side of the top 16 there is fastened a continuation 87 of the conduit 84 beneath the opening 86, and the conduit section 87 extends rearwardly to a position 88 where it opens into the catcher at approximately the position where the catcher is joined to the rear of the sweeper housing. In order to adjust for the suction force of the blower, there is provided an adjustable vane or blade 89, mounted on a pin 90 turnable through the housing and at the inner wall thereof, the pin terminating in a crank handle 91 outside the housing so that when the crank is turned by hand, the blade plate 89 may be pivoted to extend across the inlet channel of conduit 84 to any desired degree to block in whole or in part the inlet passageway to the blower.

The blower is provided with an outlet conduit 92 which is carried forwardly from the blower, and after making a right angle, it enters the cavity 93 of a cylindrical housing 94, or centrifuge, mounted on the top 16 of the sweeper, the conduit 92 entering this housing at entrance opening 95. The cylindrical housing 94 is enclosed around the sides and bottom, but is provided with an opening 96 at the top; and to the neck of this opening 96 there is attached a porous bag 97 by a clamp 98 in a suitable manner. The bag 97 may be of any suitable or conventional type such as is commonly used on vacuum cleaners to allow the air to blow through from the inside to the outside, and collecting the dust within the bag during this process. Preferably, but not necessarily, there is provided a cover for the bag which may be in the form of a wire mesh construction, or the like, 99. This is shown as a cylinder open at the lower end and set in proper position against bosses 100. The top of the cylinder 99 may also be enclosed by the mesh.

Figure 2:
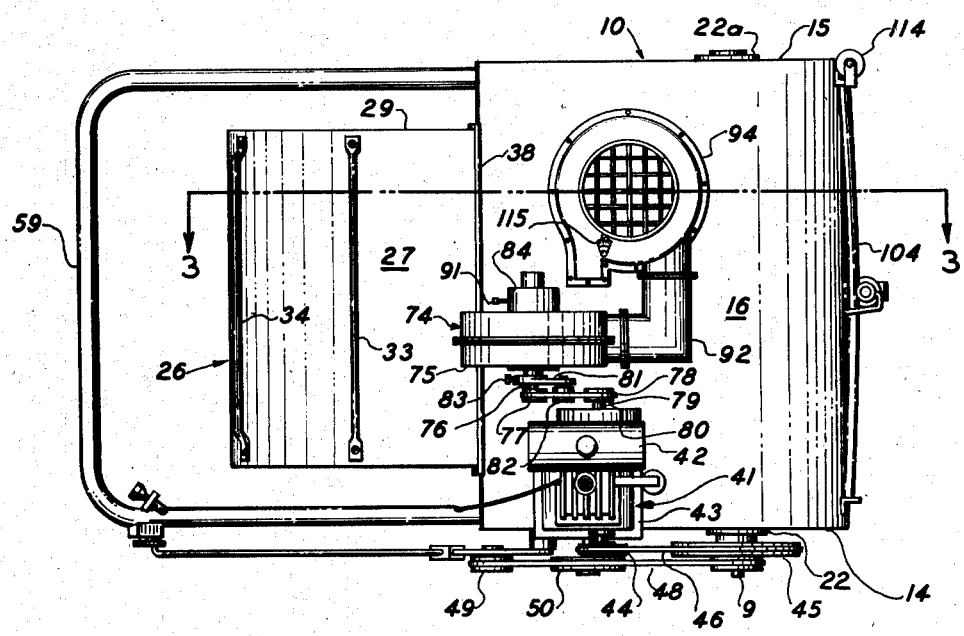
Fig. 2 is a top view of the sweeper.

In order to provide for the collection of particles which are heavier than ordinary dust, there is provided an exit opening 101 from the housing 94; and an adjustable deflecting vane 116, operable from a handle 115 (Fig. 2), is preferably provided to deflect the particles into this exit opening.

Beneath this exit opening there is constructed a conduit 102 having a bottom and two sides passing up underneath the sweeper housing, and this conduit extends rearwardly to a position just within the entrance to the collector. Preferably at this exit opening, there is provided a deflector 103 which serves to deflect the objects to one side of the collector.

At the front of the machine, there is provided a bar 104 mounted horizontally, as shown, across the front of the sweeper housing. At the center, this bar is spaced somewhat from the sweeper housing by a spacer 105 to which it is supported; and at this central position, there is provided the mounting arrangement for the front wheel 12. This comprises a pin 106 passing through the wheel and a fork 107 extending upwardly on each side thereof. The top of the support, or fork, 107 is mounted to a cylindrical bar or plunger 108 which extends upwardly within a hollow cylinder 109. The plunger is provided with a number of parallel horizontal bores 110; and the cylinder 109 is correspondingly provided with a hole 111 so that a pin 112 may be inserted through hole 111 and to any one of the registration holes 110. The pin extends forwardly out of hole 111 around the side of cylinder 109, and is provided with a depending portion 113 adapted to hang over the bar 104 (see Fig. 3). Thus, by inserting the pin 112 in any one of the registration holes 110, the height of the housing relative to the ground may be adjusted.

It is preferred also that a guide wheel 114 be provided at least at one side of the sweeper housing and protruding somewhat beyond the side of the housing. This will enable the sweeper to be run close to a wall, so that the idling wheel 114 can roll along the wall and thus prevent banging of the sweeper against the wall.

In the operation of the device, the operator will start the motor, and this will cause the brush and fan arrangement 25 to rotate in the clockwise direction (with reference to Fig. 3). Thus, anything in the space between the forward and aft depending flaps 18 and 19 will be swept up and thrown back to the collector. To propel the sweeper forward, the operator need only operate lever 56 to engage the belt 48 with the floating differential 50, thus moving the machine forward, and also enabling him to turn it easily in any direction he wishes. At the same time that the motor was started, the auxiliary blower 74 will also be operated to draw air out of the collector and thus reduce the pressure in it so as to prevent seepage of dust out from such space as may exist between the collector and the housing. The heavier debris will fall into the collector, but the lighter debris and dust will be drawn up through the auxiliary blower and blown through conduit 92 to the base of the centrifuge 94. The air from the auxiliary blower will blow out through the bag 97, thereby catching the dust in the bag in a well known manner. Such debris, heavier than dust, as may reach the centrifuge will be blown centrifugally around the inside periphery of the centrifuge, and while such debris is blowing around, it will drop through the opening 101 and into the conduit 102 and back into the collector again.

To regulate the amount of suction from the auxiliary blower, the valve handle 91 may be turned to any desired position of adjustment; and to help control and facilitate the dropping of the particles through opening 101, the handle 115 may be operated to turn the vane 116 in any desired angle.

It may sometimes be desirable to enable the operator to ride behind the sweeper. This may be done by provision of a seat 117 mounted on a vertical bar 118 fixed at the bottom to a horizontal bar forming the axis of a pair of side wheels 119; and the vertical bar 118 is also in fixed relation to a horizontally extending bar 120 provided with an eye at its forward end which fits over a hook 121 fastened on the bottom of the collector.

It will be recognized that by our invention we have provided an efficient power driven sweeper useful for heavy work in such locations as factories or the like where it is desired to sweep up heavy debris including even pieces of wood and metal, and to collect it in a large collector. By our novel construction this can be done with a minimum of effort by the operator, and with facility for moving the sweeper close to walls. Furthermore, by reason of the differential arrangement, it can readily be turned 180° by the operator while travelling. During its operation, little or no dust will be drawn into the atmosphere or room, because of the auxiliary blower arrangement which draws the dust out of the collector so that it will not be blown through spaces where the collector is attached to the sweeper housing.

It will be recognized that many modifications of the construction may suggest themselves to those skilled in the art, and such modifications may be made without departure from our invention. The invention should not be construed to be limited except in accordance with the scope of the appended claims.

We claim:

1. In a power sweeper comprising a housing mounted on wheels and adapted to roll along a surface to be swept, an inlet opening at the bottom portion of the housing through which debris and dust is swept into the housing, a conduit in the housing through which the debris and dust is carried and an exhaust opening from said conduit, a brush and fan means located in the housing at said inlet opening and arranged to sweep and blow the debris and dust from the surface through said inlet opening and through the conduit to the exhaust opening, and a detachable collector having a mouth connected to cover said exhaust opening and thereby receive said debris and dust, said connection being subject to expulsion of dust from the conduit to the atmosphere outside the housing at the junction between the exhaust opening and the mouth, the improvement which comprises: an auxiliary blower, an inlet duct leading to the auxiliary blower from the space within the collector, an outlet duct from the blower through which air is exhausted from the blower, a centrifuge connected with the said outlet duct, a dust collector connected to the centrifuge and an exit from the centrifuge, separate from, and below, the dust collector, through which heavier particles drop.

2. Apparatus according to claim 1 in which a conduit communicates from the exit of the centrifuge to the collector to convey debris from the centrifuge back to the collector.

3. In a power sweeper comprising a housing mounted on wheels and adapted to roll along a surface to be swept, an inlet opening at the bottom portion of the housing, through which debris and dust is swept into the housing, a conduit in the housing through which the debris and dust is carried and an exhaust opening from said conduit, a rotary brush and fan means located in the housing at said inlet opening and arranged to sweep and blow the debris and dust from the surface through said inlet opening and through the conduit to the exhaust opening, and a detachable collector having a mouth connected to cover said exhaust opening and thereby receive said debris and dust, said connection being subject to expulsion of dust from the conduit to the atmosphere outside the housing at the junction between the exhaust opening and the mouth, the improvement which comprises: an auxiliary blower, an inlet duct leading to the auxiliary blower from the space within the collector, an outlet duct from the blower through which the air is exhausted from the blower, a hollow cylinder placed with its longitudinal axis in a substantially vertical direction and having the lower end thereof closed to form a floor for the cylinder, said outlet duct leading tangentially into the cylinder so that particles blown into the cylinder through said outlet duct whirl around the cylinder, the top of the cylinder having an exhaust opening through which the air blows, the floor of the cylinder having an opening, and a duct leading from beneath the last-mentioned opening to the collector so that particles whirling around the floor drop through said last-mentioned opening and are carried to the collector while dust is carried upwardly by the air blowing through the opening at the top of the cylinder.

4. Apparatus according to claim 3 in which an adjustable deflecting vane is located in relation to said floor opening to urge the whirling particles to drop through the opening.

5. Apparatus according to claim 3 in which an adjustable vane is located at said inlet duct to control the flow of air through the auxiliary blower.

References Cited in the file of this patent

UNITED STATES PATENTS

| Number | Name | Date |
|---|---|---|
| 463,236 | Schaeffer | Nov. 17, 1891 |
| 514,677 | Furnas | Feb. 13, 1894 |
| 548,201 | Hvass | Oct. 22, 1895 |
| 691,184 | Shickler | Jan. 14, 1902 |
| 752,152 | Green | Feb. 16, 1904 |
| 1,078,352 | Hervey | Nov. 11, 1913 |
| 1,097,911 | Brugger | May 26, 1914 |
| 1,137,184 | Brugger | Apr. 27, 1915 |
| 1,189,016 | Thompson | Jan. 27, 1916 |
| 1,260,407 | Lachmann et al. | Mar. 26, 1918 |
| 1,374,933 | Lund | Apr. 19, 1921 |
| 1,405,437 | Quam | Feb. 7, 1922 |
| 1,531,496 | Parker | Mar. 31, 1925 |
| 1,944,976 | Hamilton | Jan. 30, 1934 |
| 2,136,676 | Davis | Nov. 15, 1938 |
| 2,298,054 | Howell | Oct. 6, 1942 |

FOREIGN PATENTS

| Number | Country | Date |
|---|---|---|
| 83,257 | Germany | Sept. 19, 1895 |